(12) United States Patent
Bisschop et al.

(10) Patent No.: US 9,614,446 B2
(45) Date of Patent: Apr. 4, 2017

(54) POWER SUPPLY DEVICE

(71) Applicant: KONINKLIJKE PHILIPS N.V., Eindhoven (NL)

(72) Inventors: Oedilius Johannes Bisschop, Drachten (NL); Tjerk Kornelis Bij De Leij, Drachten (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 196 days.

(21) Appl. No.: 14/372,578

(22) PCT Filed: Jan. 9, 2013

(86) PCT No.: PCT/IB2013/050196
§ 371 (c)(1),
(2) Date: Jul. 16, 2014

(87) PCT Pub. No.: WO2013/108155
PCT Pub. Date: Jul. 25, 2013

(65) Prior Publication Data
US 2014/0362609 A1    Dec. 11, 2014

(30) Foreign Application Priority Data
Jan. 19, 2012   (EP) ..................... 12151761

(51) Int. Cl.
*H02M 3/335*     (2006.01)
*H02J 7/04*       (2006.01)
(Continued)

(52) U.S. Cl.
CPC ......... *H02M 3/33507* (2013.01); *H02J 7/007* (2013.01); *H02J 7/022* (2013.01); *H02J 7/045* (2013.01); *H02M 3/33523* (2013.01)

(58) Field of Classification Search
CPC ............. H02J 7/007; H02J 7/022; H02J 7/045
(Continued)

(56) References Cited

U.S. PATENT DOCUMENTS 6,646,894 B2 * 11/2003 Hong ................ H02M 3/33507
                                                348/E5.127
6,842,350 B2 * 1/2005 Yamada ................ H02M 3/335
                                                   363/21.12
(Continued)

FOREIGN PATENT DOCUMENTS

EP         1213823 A2    6/2002
JP         2000134816 A   5/2000

*Primary Examiner* — Jessica Han
*Assistant Examiner* — David A. Singh

(57) ABSTRACT

A power adaptor to supply power for a portable device has an input circuit (21) for receiving mains input power, a power switch device (25), a power inductance (24) and an output circuit (22) coupled to the power inductance to provide the supply power for the portable device, and a controller (26) for controlling the power switch device according to a supply power requirement of the portable device. The adaptor has a measurement inductance (27) magnetically coupled to the power inductance, and the controller comprises a measurement input (28) for detecting a measurement signal indicative of a magnetic state of the power inductance. The controller detects the supply power requirement based on the magnetic state in response to a controlling of the power switch device via the controller. Advantageously different portable devices can be supplied by appropriate power.

14 Claims, 4 Drawing Sheets

(51) Int. Cl.
*H02J 7/02* (2016.01)
*H02J 7/00* (2006.01)

(58) Field of Classification Search
USPC ....... 363/13, 15–16, 20, 21.01, 21.12, 21.16
See application file for complete search history.

(56) References Cited

U.S. PATENT DOCUMENTS

| | | | |
|---|---|---|---|
| 7,064,968 B2* | 6/2006 | Choi | H02M 3/33523 363/21.12 |
| 7,864,550 B2* | 1/2011 | Duan | H02M 3/33507 363/21.12 |
| 2002/0067626 A1* | 6/2002 | Koike | H02M 3/33523 363/21.12 |
| 2007/0291516 A1* | 12/2007 | Nakamura | H02M 1/32 363/21.01 |
| 2008/0088177 A1* | 4/2008 | Patel | H01R 13/6675 307/12 |
| 2010/0039835 A1* | 2/2010 | Shimada | H02M 3/33507 363/21.12 |
| 2010/0176778 A1 | 7/2010 | Lin et al. | |
| 2010/0208500 A1* | 8/2010 | Yan | H02M 3/33523 363/21.12 |
| 2010/0246216 A1* | 9/2010 | Coulson | H02M 3/33523 363/21.12 |
| 2010/0308733 A1* | 12/2010 | Shao | H02M 1/4225 315/119 |
| 2011/0227506 A1 | 9/2011 | Ren et al. | |

* cited by examiner

POWER SUPPLY DEVICE

CROSS-REFERENCE TO PRIOR APPLICATIONS

This application is the U.S. National Phase application under 35 U.S.C. §371 of International Application No. PCT/IB2013/050196, filed on Jan. 9, 2013, which claims the benefit of European Application No. 12151761.9 filed on Jan. 19, 2012. These applications are hereby incorporated by reference herein.

FIELD OF THE INVENTION

The invention relates to a power supply device for adapting mains input power to supply power for a portable device connected to the power supply device, the power supply device comprising an input circuit for receiving the mains input power and providing input supply power, a power switch device coupled to the input supply power, a power inductance coupled to the power switch device, an output circuit coupled to the power inductance to provide the supply power for the portable device, and a controller for controlling the power switch device according to a supply power requirement of the portable device.

The invention relates to the field of power adaptors, e.g. wall adaptors, for adapting mains power to supply power or battery charge power for rechargeable portable devices, e.g. cell phones or domestic appliances such as shavers.

BACKGROUND OF THE INVENTION

Wall adaptors for adapting mains power to provide supply power to consumer devices and/or battery charge power for rechargeable portable devices are well known. Such wall adapters have been used for many years for charging mobile rechargeable devices like for example cell phones or shavers. Such portable devices are delivered to customers accompanied by a wall adaptor, which is to be connected at the input side to the available mains power, usually 110 V or 230 V AC. The output side of the adaptor provides a supply voltage and/or current that is suitable for the respective portable device, i.e. which is according to a supply power requirement of the portable device. Commonly, such adaptors have an input circuit for receiving the mains input power and providing input supply power to a power converter circuit. Such a circuit has a power switch device coupled to the input supply power and a power inductance coupled to the power switch device. Furthermore, an output circuit is coupled to the power inductance to provide the supply power for the portable device. A controller is included for controlling the power switch device, i.e. regularly switching the power switch device on and off at a switching frequency to generate input current pulses in the power inductance. The output circuit draws output current from the power inductance, for example via a secondary inductance magnetically coupled to the power inductance. The various components and the control of the switching is designed according to a supply power requirement of the portable device.

SUMMARY OF THE INVENTION

It has been noted that, for the common user, a multitude of portable devices will involve also a multitude of wall adaptors. Although to some extend some output power requirements may be according to a standardized supply power requirement, such as USB, in practice many different adaptors are in use. Furthermore adaptors may be provided with setting switches to be adjusted by the user to a required output power, or power adapters may have multiple outputs to connect to different portable devices. However such known adaptors are complicated, relatively expensive and prone to user errors when connected or set in a wrong manner, and may even lead to damage to the portable device.

It is an object of the invention to provide a single adaptor which can provide supply power for different portable devices.

For this purpose, according to a first aspect of the invention, the device as described in the opening paragraph, comprises a measurement inductance magnetically coupled to the power inductance, and the controller comprises a measurement input coupled to the measurement inductance for detecting a measurement signal indicative of a magnetic state of the power inductance, and the controller is arranged for detecting the supply power requirement based on the magnetic state in response to said controlling the power switch device.

The measures have the effect that the magnetic state of the power inductance is monitored by the controller via the measurement inductance. The measurement signal is generated via the measurement inductance and detected by the controller via a controller input. The magnetic state of the power inductance, in particular the magnetic state due to flux generated by input current via the power inductance from the input supply power via the power switch device, and subsequent magnetic state due to output current to the output circuit, e.g. via a secondary inductance magnetically coupled to primary power inductance for constituting a transformer, is detected by the controller. Based on the detected magnetic state the controller assesses the power drain, such as supply current and/or supply voltage, as caused by the portable device that is, at that time, connected. Advantageously the device constitutes a power supply device suitable for different portable devices, which power supply device automatically adjusts controlling the power switch device to provide a respective, connected portable device according to its detected supply power requirement. For example, the power supply device may be suitable for a few different types of portable devices, e.g. 3 different types have respective 3 different supply power requirements. The actual device type is detected based on the respective response of the connected device to activating the output circuit as detected via the magnetic state of the power inductance.

Optionally, the controller is a single integrated circuit and comprises an output for providing a control signal to the power switch device, and a processor including firmware for said detecting the supply power requirement and controlling the power switch device according to the detected supply power requirement of the portable device. The single integrated circuit enables easy programming of the function of the power supply device to accommodate a different set of power requirements. Advantageously, the same hardware may be programmed for a specific set of portable devices to constitute a wall adaptor which provides required supply power for the different portable appliance devices in the specific set.

Optionally, the magnetic state is a demagnetization state. The demagnetization state is achieved after a period a magnetization due to input current via the power inductance from the input supply power as switched on via the power switch device, and after a further period in which no input is provided but output current is generated for the output circuit. When the demagnetization state is achieved, no current is flowing any more.

Optionally, the controller is arranged for determining a demagnetization time based on the demagnetization state. The demagnetization time is a measure for the current flowing at the output side.

Optionally, the controller is arranged for determining an output current based on the demagnetization time and a power-on time during which the power switch device is switched on. The output current, on average, is generated by switching the power switch on during the power-on time, and subsequently switching the power switch off during the demagnetization time.

Optionally, the controller is arranged for further determining the output current based on an additional power-off time during which the power switch device is switched off, the additional power-off time being provided from the end of the demagnetization time to the start of the power-on time. The output current, on average, is generated by switching the power switch on during the power-on time, and subsequently switching the power switch off during the demagnetization time, and maintaining the off state during the additional power-off time, before activating the power switch device for the next cycle.

Optionally, the controller has an input for detecting a current via the power inductance, and is arranged for determining the power-on time in dependence of the current via the power inductance during the power-on time. The current via the power inductance is measured via a further measurement input of the controller. For example a digital measurement input may detect that a predetermined current is achieved, or a voltage measurement input may detect a current in a predefined range via measurement circuit.

Optionally, the controller is arranged for further determining the output current by making the power-on time dependent on a ratio of the power-on time and the demagnetization time. Advantageously, the regulation by the controller is made more accurate by adjusting the power-on time or peak current in dependence of the ratio of the primary power-on time and secondary power off time, e.g. the demagnetization time.

Optionally, the measurement input is arranged for measuring a measurement voltage of the measurement signal for enabling the controller to assess a reflected output voltage from the output circuit. The measurement voltage has a known relation to the output voltage, because the output voltage is reflected from the output circuit to the measurement inductance. Advantageously the output voltage can be derived when measuring the reflected voltage. Optionally, the controller is arranged for determining an output voltage based on a power-on time of the power switch device and the measurement voltage. The output voltage is set by controlling the power-on time based on the measurement voltage.

Optionally, the controller is arranged for said detecting the supply power requirement based on the measurement voltage.

Optionally, the controller is arranged for detecting a current via the power inductance during the power-on time for assessing an output current from the output circuit based on a predefined ratio between the input current and the output current. The predefined ratio may be determined from a ratio of a primary and secondary inductance constituting a transformer, and/or from further circuit components arranged between the power inductance and the output current.

Optionally, the controller is arranged for engaging a standby mode by at least one of setting a power switch frequency to a reduced level so that a supply voltage of the controller which depends on the power switch frequency is maintained at a predefined level; a predetermined power-on time during which the power switch device is switched on followed by a predetermined power-off time during which the power switch device is switched off. The standby mode may be triggered when the supply power is detected to be substantially zero, e.g. because no portable device is connected.

Optionally, the controller is arranged for applying an end of charge mode during which a trickle charge is provided to the portable device based on at least one of timer control in dependence of the detected supply power requirement;

output voltage control based on the measurement signal indicative of a reflected output voltage from the output circuit;

output current control based on the measurement signal indicative of a demagnetization time.

Advantageously the trickle charge is activated based on an appropriate control mechanism, which indicates that a battery of a connected portable device no longer needs charging.

Further preferred embodiments of the device and method according to the invention are given in the appended claims, disclosure of which is incorporated herein by reference.

BRIEF DESCRIPTION OF THE DRAWINGS

These and other aspects of the invention will be apparent from and elucidated further with reference to the embodiments described by way of example in the following description and with reference to the accompanying drawings, in which.

The figures are purely diagrammatic and not drawn to scale. In the Figures, elements which correspond to elements already described have the same reference numerals.

DETAILED DESCRIPTION OF EMBODIMENTS

Figure 1:
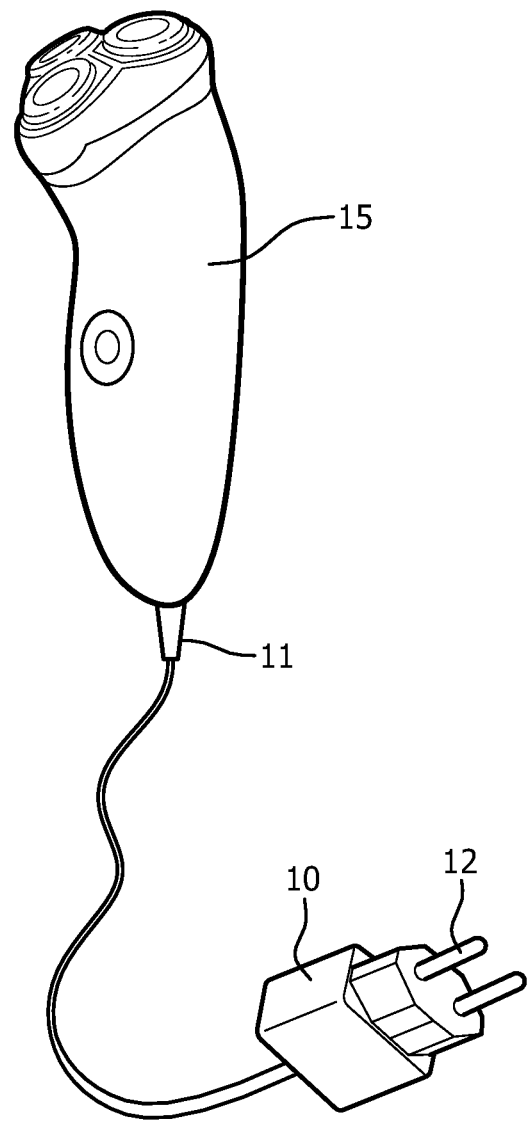
FIG. 1 shows a wall adapter connected to a shaver.

FIG. 1 shows a wall adapter connected to a shaver. The Figure shows a power supply device 10, which has a mains connector 12 for connecting to a socket that provides mains power, e.g. a wall socket. The device has an output circuit connected via a power supply connector 11 to provide the supply power for a portable device 15, for example a shaver. The power supply device is for adapting the mains input power to supply power for the portable device as connected to the power supply device. The power supply device comprises a circuit for power conversion, for example as described below with reference to FIG. 2.

Wall adapters come in many different versions. For example for shavers and groomers of a well known brand currently three types of wall adapters with different output characteristics are used:

Type1: Constant current output of 70 mA
Type2: Constant voltage output of 8V
Type3: Constant voltage output of 15V The output characteristics match the power requirements of the corresponding portable devices. For example, the constant current version Type1 is used for portable devices that require directly charging batteries. So no additional charging electronics is needed inside the device.

Because the respective, different devices require different power source output characteristics previously three types of wall adapters are used. The current system proposes a single universal wall adapter that automatically sets its output characteristic according to the power requirements of the connected load. The proposal presents a low-cost intelligent adapter circuit that is able to detect a supply power requirement of the connected portable device, and appropriately sets the output power, for example charging control for rechargeable batteries. Therefore a multitude of low-voltage portable devices, like shavers/groomers, can be supplied by this universal adapter.

The adapter includes an input circuit for receiving the mains input power and providing input supply power, and a fly-back converter to convert the input supply power to an output supply power, usually at a lower voltage. The converter includes a power switch device coupled to the input supply power, a power inductance coupled to the power switch device, and an output circuit coupled to the power inductance to provide the supply power for the portable device. In particular, the device includes a controller for controlling the power switch device according to a supply power requirement of the portable device. The controller may be a single integrated circuit which comprises an output for providing a control signal to the power switch device, and a processor including firmware for said detecting the supply power requirement and controlling the power switch device according to the detected supply power requirement of the portable device. Such controller may be a low-cost/low pin-count microcontroller, which both controls a fly-back converter and sets the output characteristic of the converter according to a detected power requirement as described below.

A measurement inductance is magnetically coupled to the power inductance, for example an auxiliary winding on a transformer formed by the power inductance and a secondary inductance coupled to the output circuit. The controller comprises a measurement input coupled to the measurement inductance for detecting a measurement signal indicative of a magnetic state of the power inductance. It is noted that the function of the measurement inductance may also be constituted by a part of the power inductance, or by the power inductance itself, when properly coupled to the measurement input of the controller. The auxiliary winding on the transformer is used to measure the transformer demagnetization time and/or the output voltage. With these parameters the controller is able to:
- distinguish between connected device types;
- control the corresponding output characteristic;
- detect a connected or disconnected appliance device when the adapter is mains connected;
- start a timer based on the demagnetization time compared with a threshold time value;
- set a constant current output characteristic for direct charging of batteries
- decrease the charge current to a predetermined level to prevent overcharging of batteries;
- switch off the charge current in a no-load/standby mode for very low power consumption;
- control a signaling LED with a predetermined flexible signaling pattern.

The function of detecting connected devices, and distinguishing between connected device types, is based on setting the output power in a detection mode, in which the power drain of the connected device is assessed based on measuring the voltage of the measurement signal on the measurement inductance in response to setting the output according to a predetermined detection pattern. In the detection pattern the output voltage and/or current are set to a sequence of respective measurement levels. On each measurement level the output circuit is driven by switching said power switch device off and on for respective predetermined periods or until a predetermined input current via the power inductance is detected, as described below in detail. The resulting output currents and/or voltages on each measurement level are detected when driving the power inductance at the respective measurement levels. If no current appears to be drawn from the output the controller detects that no appliance device is connected.

When an output current is detected, an appliance device is detected to be connected to the adaptor, and subsequently the power requirement of the connected device is assessed based on the response of the connected device to said detection pattern. In particular measurement levels are initially set to result in low voltages to prevent damaging the connected device. The sequence of detected resulting output voltages and/or currents at the respective measurement levels is compared to expected sequences of various different portable devices, and a particular device type having a particular power requirement is detected when a match is found by the controller. It is noted that said detection pattern is designed for distinguishing between the number of different portable device types that is supported by the power supply device, e.g. 3 different types. Hence when a low number of different devices need to be distinguished, only one or two measurement levels may suffice, whereas for distinguishing 10 different portable devices an extended sequence of measurement levels is necessary. The detection pattern may include branches to different measurement level sub-sequences in dependence of detected responses, e.g. to distinguish in detail between different types of rechargeable batteries or respective changing levels of a connected battery.

Figure 2:
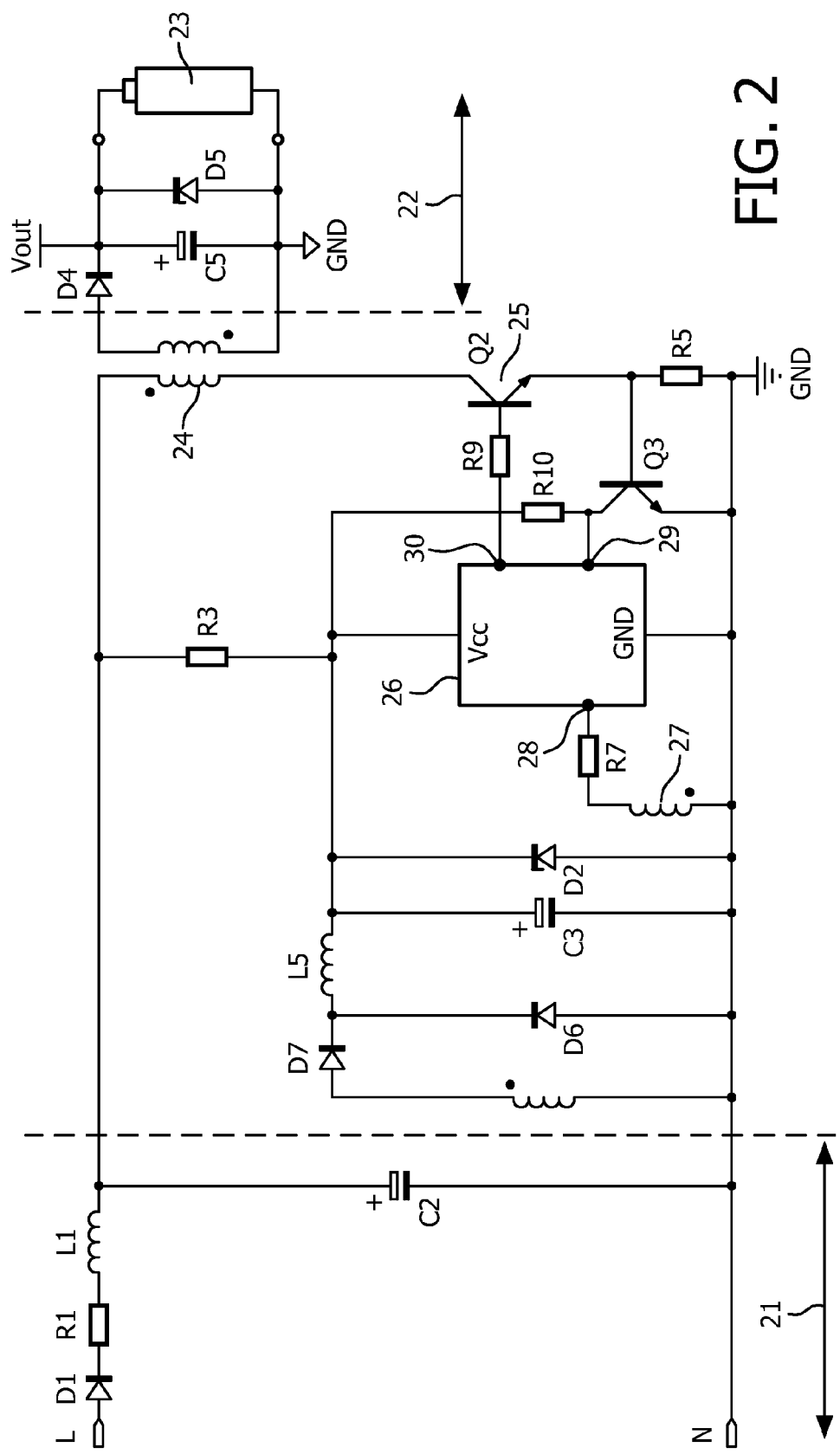
FIG. 2 shows a power conversion circuit for the power supply device.

FIG. 2 shows a power conversion circuit for the power supply device. The circuit is a practical example of the converter circuit suitable for automatically detecting multiple different power requirements as proposed. An input circuit 21 is provide for receiving the mains input power at terminals L and N, and provides input supply power via a rectifier diode D1 and a resistor R1 and coil L1, and a capacitor C2. A power switch device 25, transistor Q2, is coupled to the input supply power via a power inductance 24, primary coil 24. An output circuit 22 is coupled to the power inductance via a secondary coil to provide the supply power for the portable device, schematically indicated by a rechargeable battery 23. A controller 26 has an output 30 for controlling the power switch device 25 to generate the output power according to a supply power requirement of the portable device.

The converter circuit is arranged detecting the supply power requirement based on the magnetic state in response to said controlling the power switch device, as described now. Thereto, the power conversion circuit device further includes a measurement inductance 27, which is magnetically coupled to the power inductance 24. The controller 26 comprises a measurement input 28 coupled to the measurement inductance for detecting a measurement signal indicative of a magnetic state of the power inductance. The controller is arranged, e.g. via firmware, for detecting the supply power requirement based on the magnetic state in response to controlling the power switch device.

The power conversion circuit device further includes a local supply circuit for providing operating power to the converter. In the example a further winding on the transformer is provided, which derives power from the energy generated by the power inductance. The power is rectified by diodes D7 and D6, coil L5 and capacitor C3, and maximized by zener diode D2 to provide a suitable controller supply voltage Vcc, e.g. 5 Volt.

The power conversion circuit device may further include a current detection input 29 for detecting, in the power inductance, an inductance current of a predetermined level via a measurement resistor R5 and transistor Q3. Alternatively a current measurement circuit may be provided to measure the actual inductance current in a predetermined range, e.g. by providing a voltage sensitive input and an appropriate measurement voltage related to the inductance current in the power inductance. In such embodiments, the controller is arranged for determining the power-on time in dependence of a current via the power inductance during the power-on time.

In the example circuit a microcontroller directly controls the high voltage NPN transistor (Q2) of a fly-back converter. The primary peak current is measured with R5 and Q3 via a current input PeakCur 29. After turning on Q2 a peak current detection is done by polling the PeakCur input. If the peak level has been detected Q2 is turned off Higher peak currents can be adjusted by inserting a software delay between the detection and the turn-off of Q2. The power switch device may be turned on after demagnetization has been detected. A lower average current may be achieved by including an additional power-off time after demagnetization has been detected; a higher average current may be achieved by setting a shorter off-time than the detected demagnetization time. Demagnetization detection is done by polling the measurement input 28, called DeMag input, during the secondary stroke, i.e. when the power switch device Q2 is turned off Optionally the DeMag input may be an analog input of the microcontroller, by which the reflected output voltage can be measured during the secondary stroke. With this parameter a constant output voltage characteristic can be set by appropriately controlling the power switch device.

Figure 3:
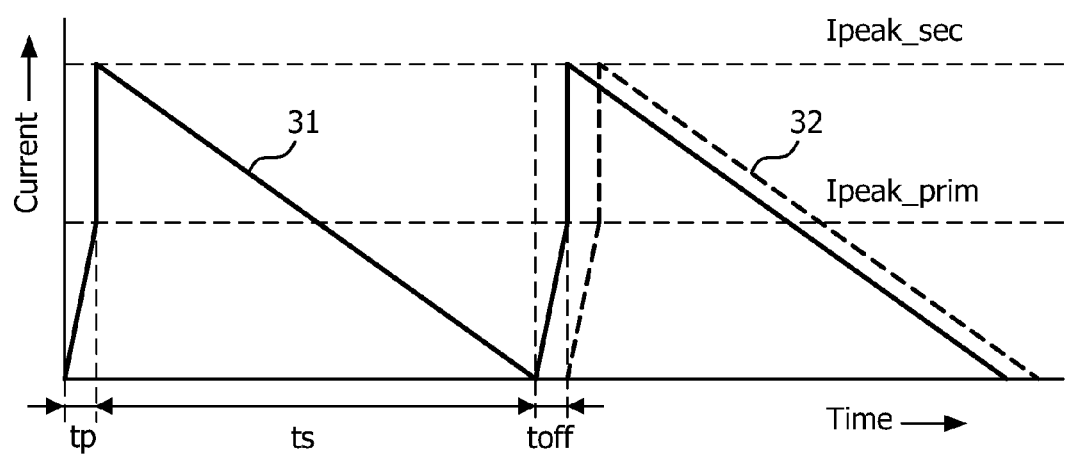
FIG. 3 shows transformer primary and secondary current for constant current control.

FIG. 3 shows transformer primary and secondary current for constant current control. In the diagram a first current curve 31 shows the current during operation where a power requirement for a constant output current is detected, e.g. a portable device having a power supply connection directly to the battery. During a first period of the curve, called primary stroke time Tp, the power switch device is turned on and the current in the power inductance increases from zero to the value Ipeakprim, indicated by the dotted line so marked. Subsequently, the power switch device is turned off for a second period of the curve, called secondary stroke time Ts, and the current in a the secondary winding, magnetically coupled to the power inductance, decreases to zero from the highest value Ipeak_sec, indicated by the dotted line so marked. At the moment that the current reaches zero the magnetic state is considered to be demagnetized, and the period starting at turn-off of the power switch device up to reaching the demagnetized state is called demagnetization time.

It is noted that the ratio between the primary current and the secondary current is substantially determined by the transformer ratio. The actual current is reduced by the effect of the output voltage across the secondary winding during the secondary stroke. The output voltage is reflected to further inductances which are magnetically coupled, such as the measurement inductance. By providing a voltage sensitive input at the controller the reflected voltage can be measured, which has a predetermined ration to the actual output voltage due to the transformer ratio.

FIG. 3 shows a further curve 32 indicated by a dotted line. The curve indicates a further current control which includes a further period, an additional power-off time called Toff, after the demagnetization time, during which the power switch remains turned off. The controller is arranged for further determining the output current based on the additional power-off time. The additional power-off time is provided from the end of the demagnetization time to the start of the power-on time, to reduce the average output current, or reduce the output voltage, as required by the detected power requirement.

A basic current control is to control the converter in so called boundary mode, in which the output current is maximized by controlling the input current to increase to the maximum value of Ipeak. Because Ipeak_sec is constant and Ts will be much higher than Tp the output current will be nearly independent of the battery voltage. Optionally, the regulation can be made more accurate by making the peak current dependent to some extent on the Tp/Ts ratio. This may be implemented in the software in the controller. Hence the controller is arranged for further determining the output current by making the power-on time dependent on a ratio of the power-on time and the demagnetization time.

An accurate method of regulating the output power is based on the principle that the current can be regulated at a constant level complying with the following formula:

$$Iavg = Ipeak \cdot n \cdot \frac{ts}{ts + tp + t\_off} \cdot \frac{1}{2}$$

Ipeak: is a constant predetermined value or can be adjusted to regulate the current set point
N: is fixed and predetermined in the transformer construction,
ts: is measured via the controller measurement input and software,
tp: is measured via the controller measurement input and software,
toff: is adjusted by the controller to regulate the current to the set point of the charger.
This method consumes more processor time but provides the most accurate current control.

Furthermore, based on the Tp/Ts ratio also load detection is possible. The load will have specific properties at specific predetermined voltage levels. By detecting the output current when providing one or more specific voltage levels, different device types can be distinguished.

Optionally, in the power supply device as described above, the controller is arranged for generating a type-measurement voltage at a supply power output of the output circuit, which type-measurement voltage is below an operational voltage required for an electronic circuit of the portable device to be operational, and detecting a type-measurement current drawn by the portable device for determining the supply power requirement of the portable device.

Optionally, device type detection is enhanced by providing a specific, different resistor value parallel to the input connection of the different device types. After a device connection detection the controller then first sets the output voltage to a predetermined low value, said type-measurement voltage. At this low output voltage any electronics inside the device will not be operational and therefore the load current will be mainly defined by the added resistor. With the Tp/Ts ratio the microcontroller then is able to distinguish between devices and set the appropriate output characteristic.

Optionally, portable devices for use with a power supply device as described above, may be provided with respective, different characteristics for type detection as follows. The power supply input of the respective portable device is provided with a resistive element such that, when providing a specific type-measurement voltage at the supply input, a respective type-measurement current is drawn from the power supply device indicative of the supply power requirement of respective the portable device.

Optionally, the power supply device may provide end of charge control for rechargeable batteries. Hence, besides the converter supply power control, the controller may also provide an additional integrated end of charge control. Several principles can be used to detect, or at least reasonably predict, the end of the charging process.

Optionally the end of charge is timer controlled. A timer is set to enable a programmable or predetermined period of charging. When reaching the end of the charge period, the set point for the supply power is set to a trickle charge level. Via the Toff time control the charge current is decreased to the trickle level.

Alternatively the end of charge is voltage controlled. The reflected voltage information is used to compare with a set point to end or decrease the charge current.

Furthermore, the secondary stroke time may be controlled. The Ts information is used for comparing with a set point value to end or decrease the charge current.

Furthermore, a standby or low power mode may be provided. In the system standby/no load power can be minimized by reducing switching frequency to a level where only the local power supply voltage of the controller is maintained for proper functioning. The local supply voltage level can be detected via an additional voltage input of the controller, and when the voltage is below a threshold, the flyback converter is started to keep the correct minimum supply voltage for the controller. Alternatively a fixed on/off time, i.e. a relatively long off time, can be used to maintain the controller local supply voltage. In both cases the controller can enter a standby mode to reduce current consumption to a level where only R3 is needed to maintain the proper voltage on C3. In such mode the Ts information may be regularly updated by switching the controller to normal operation at a predetermined time interval.

A start-up power may be provided to the converter circuit as follows. Start-up of the converter may be done by providing initial power to the controller power supply Vcc via a resistor to the input power such as R3 coupled to buffer capacitor C3. Subsequently the forward converter circuit (L5, D6, and D7) may be activated, which will supply enough supply current for further activating the controller. The local power supply circuit in FIG. 2 is active via D7 during the primary stroke, hence the local supply power will even be available when the output of the converter is short circuited.

Figure 4:
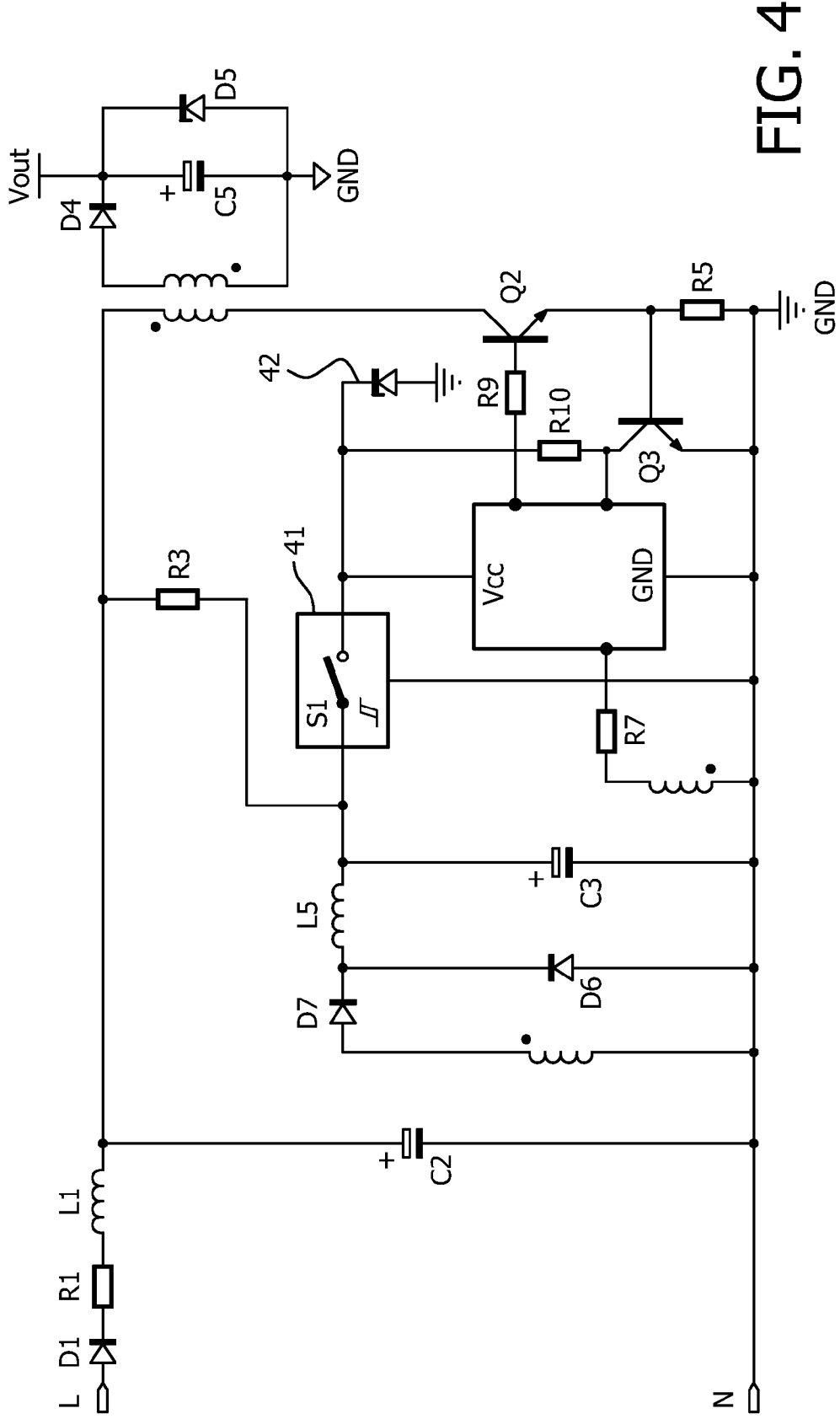
FIG. 4 shows a power conversion circuit for the power supply device having a start-up switch.

FIG. 4 shows a power conversion circuit for the power supply device having a start-up switch. The power conversion circuit is equal to the circuit described with FIG. 2, except for an additional start-up switch S1 41. The switch S1 is coupled between the supply voltage from capacitor C3 and the controller power supply Vcc. The zener diode D2 of FIG. 2 has been replaced by zener diode 42 directly coupled to the controller power supply Vcc. A well defined start up is provided by using a Schmitt trigger switch for S1 as follows. Via R3 the buffer capacitor C3 is charged to a certain threshold level. When the voltage exceeds the specific threshold level, the voltage on the buffer capacitor C3 is connected by S1 to the supply pin Vcc of the controller. In this case the controller immediately can start executing its program. A proper reset is guaranteed and also the buffer capacitor is sufficiently charged to operate for a short period prior to or in parallel with the operation of the forward converter. The supply voltage will be switched off by S1 when the input voltage on C3 passes the lower limit threshold level of S1. Hence a well defined stop of the system is guaranteed. The above described system has the benefit to use a high impedance R3 and hence a low stand-by current from the mains supply. The impedance value will determine the start up time and also the minimum no-load power. Hence, optionally, the power supply device has a capacitor that is charged from the mains power via a resistor, and a start-up switch between the capacitor and a power supply input of the controller, wherein the start-up switch is switched on in dependence of a predetermined threshold voltage. Optionally, the start-up switch is implemented in the microcontroller.

Although the invention has been mainly explained by embodiments using the mains 100-250V as input, the invention is also suitable for other input voltages such a car supply converters for 6-14 V DC input voltage.

It is to be noted that the invention may be implemented in hardware and/or software, using programmable components. A method for implementing the invention has the steps corresponding to the functions defined for the system as described above, in particular for determining the power supply requirement based on providing one or more type-measurement voltages.

It will be appreciated that the above description for clarity has described embodiments of the invention with reference to different functional units and processors. However, it will be apparent that any suitable distribution of functionality between different functional units or processors may be used without deviating from the invention. For example, functionality illustrated to be performed by separate units, processors or controllers may be performed by the same element, processor or controller. Hence, references to specific functional units are only to be seen as references to suitable means for providing the described functionality rather than indicative of a strict logical or physical structure or organization. The invention can be implemented in any suitable form including hardware, software, firmware or any combination of these.

It is noted, that in this document the word 'comprising' does not exclude the presence of other elements or steps than those listed and the word 'a' or 'an' preceding an element does not exclude the presence of a plurality of such elements, that any reference signs do not limit the scope of the claims, Further, the invention is not limited to the embodiments, and the invention lies in each and every novel feature or combination of features described above or recited in mutually different dependent claims.

The invention claimed is:

1. A power supply device for adapting mains input power to supply power for a portable device connected to the power supply device, wherein the portable device comprises one type of different types of portable devices, the power supply device comprising:
- an input circuit for receiving the mains input power and providing input supply power;
- a power switch device coupled to the input supply power;
- a power inductance coupled to the power switch device;
- an output circuit coupled to the power inductance to provide the supply power for the portable device;
- a controller for controlling the power switch device according to a supply power requirement of the portable device; and
- a measurement inductance magnetically coupled to the power inductance,
- wherein the controller comprises a measurement input coupled to the measurement inductance for detecting a measurement signal indicative of a magnetic state of the power inductance, and wherein the controller is arranged for detecting the supply power requirement of the portable device based on the magnetic state in response to said controlling the power switch device, and wherein the portable device being one type of different types of portable devices includes a power supply input to be connected to the output circuit of the power supply device, which power supply input of the portable device is provided with a resistive element of a specific, different resistor value of one of the different portable device types, in parallel with the power supply input of the portable device, such that, when a type-measurement voltage is provided at the power supply input of the portable device, which type-measurement voltage is below an operational voltage required for an electronic circuit of the portable device to be operational, a type-measurement current is drawn from the power supply device to distinguish between the different portable device types and which is indicative of the supply power requirement of the portable device type, and wherein the controller is further arranged for
- generating the type-measurement voltage at a supply power output of the output circuit, and
- detecting the type-measurement current drawn by the portable device for distinguishing between the different portable device types and determining the supply power requirement of the portable device type.

2. The power supply device as claimed in claim 1, wherein the controller is a single integrated circuit and comprises
- an output for providing a control signal to the power switch device, and
- a processor including firmware for said detecting the supply power requirement and controlling the power switch device according to the detected supply power requirement of the portable device.

3. The power supply device as claimed in claim 1, wherein the magnetic state is a demagnetization state, and the controller is arranged for determining a demagnetization time (Ts) based on the demagnetization state.

4. The power supply device as claimed in claim 3, wherein the controller is arranged for determining an output current based on the demagnetization time (Ts) and a power-on time (Tp) during which the power switch device is switched on.

5. The power supply device as claimed in claim 4, wherein the controller is arranged for further determining the output current based on an additional power-off time (Toff) during which the power switch device is switched off, the additional power-off time (Toff) being provided from the end of the demagnetization time (Ts) to the start of a next power-on time (Tp).

6. The power supply device as claimed in claim 4, wherein the controller has an input for detecting a current via the power inductance, and is arranged for determining the power-on time (T) in dependence of the current via the power inductance during the power-on time (Tp).

7. The power supply device as claimed in claim 4, wherein the controller is arranged for controlling according to a boundary mode, in which the output current is maximized by controlling the input current to increase to a peak current value, and further determining the output current by making the peak current value dependent on a ratio of the power-on time (Tp) and the demagnetization time (Ts).

8. The power supply device as claimed in claim 1, wherein the measurement input is arranged for measuring a measurement voltage of the measurement signal for enabling the controller to assess a reflected output voltage from the output circuit.

9. The power supply device as claimed in claim 8, wherein the controller is arranged for determining an output voltage based on a power-on time (Tp) of the power switch device and the measurement voltage.

10. The power supply device as claimed in claim 8, wherein the controller is arranged for said detecting the supply power requirement based on the measurement voltage.

11. The power supply device as claimed in claim 1, wherein the controller is arranged for detecting a current via the power inductance during the power-on time (Tp) for assessing an output current from the output circuit based on a predefined ratio between the input current and the output current.

12. The power supply device as claimed in claim 1, wherein the controller is arranged for engaging a standby mode by at least one of
- setting a power switch frequency to a reduced level so that a supply voltage of the controller which depends on the power switch frequency is maintained at a predefined level; and
- a predetermined power-on time during which the power switch device is switched on followed by a predetermined power-off time during which the power switch device is switched off.

13. The power supply device as claimed in claim 1, wherein the controller is arranged for applying an end of charge mode during which a trickle charge is provided to the portable device based on at least one of
- timer control in dependence of the detected supply power requirement;
- output voltage control based on the measurement signal indicative of a reflected output voltage from the output circuit; and
- output current control based on the measurement signal indicative of a demagnetization time.

14. A portable device for use with a power supply device as defined in claim 1, the portable device being one type of different types of portable devices, the portable device comprising:
- an electronic circuit having a supply power requirement of the one type of portable device; and
- a power supply input to be connected to the output circuit of the power supply device, wherein the power supply input is provided with a resistive element of a specific, different resistor value of one of the different portable device types, in parallel with the power supply input of the portable device, such that, when a type-measurement voltage is provided at the power supply input, which type-measurement voltage is below an operational voltage required for the electronic circuit of the portable device to be operational, a type-measurement current is drawn from the power supply device to distinguish between the different portable device types and which is indicative of the supply power requirement of the portable device type.

* * * * *